United States Patent
He et al.

(10) Patent No.: US 12,403,774 B2
(45) Date of Patent: Sep. 2, 2025

(54) METHOD AND APPARATUS FOR CONTROLLING ELECTRIC MOTOR NOISE, AND COMPUTER DEVICE AND STORAGE MEDIUM

(71) Applicants: ZHEJIANG GEELY HOLDING GROUP CO., LTD., Zhejiang (CN); NINGBO GEELY AUTOMOBILE RESEARCH AND DEVELOPMENT CO., LTD., Zhejiang (CN)

(72) Inventors: Mu He, Zhejiang (CN); Xiaolin Tang, Zhejiang (CN); Tonghang Zhao, Zhejiang (CN); Yinbin Xiong, Zhejiang (CN); Hongqing Liu, Zhejiang (CN); Long Peng, Zhejiang (CN)

(73) Assignees: ZHEJIANG GEELY HOLDING GROUP CO., LTD., Zhejiang (CN); NINGBO GEELY AUTOMOBILE RESEARCH AND DEVELOPMENT CO., LTD., Zhejiang (CN)

( * ) Notice: Subject to any disclaimer, the term of this patent is extended or adjusted under 35 U.S.C. 154(b) by 0 days.

(21) Appl. No.: 18/043,721

(22) PCT Filed: Sep. 16, 2020

(86) PCT No.: PCT/CN2020/115556
§ 371 (c)(1),
(2) Date: Mar. 1, 2023

(87) PCT Pub. No.: WO2022/056717
PCT Pub. Date: Mar. 24, 2022

(65) Prior Publication Data
US 2025/0074204 A1 Mar. 6, 2025

(51) Int. Cl.
*H02P 6/10* (2006.01)
*B60L 15/20* (2006.01)

(52) U.S. Cl.
CPC ........ *B60L 15/20* (2013.01); *B60L 2240/423* (2013.01); *B60L 2260/20* (2013.01); *B60L 2270/142* (2013.01); *B60L 2270/145* (2013.01)

(58) Field of Classification Search
CPC .......... H02P 21/50; H02P 27/08; H02P 29/50; H02P 27/12; H02P 21/05; H02P 23/04; H02P 21/22; H02P 25/098
See application file for complete search history.

(56) References Cited

U.S. PATENT DOCUMENTS

| 8,167,064 B2 | 5/2012 | Iwase et al. |
| 9,007,005 B2 | 4/2015 | Sung et al. |

(Continued)

FOREIGN PATENT DOCUMENTS

| CN | 101195377 A | 6/2008 |
| CN | 103683901 A | 3/2014 |

(Continued)

OTHER PUBLICATIONS

ISA State Intellectual Property Office of the People's Republic of China, International Search Report Issued in Application No. PCT/CN2020/115556, Jun. 7, 2021, WIPO, 4 pages.

(Continued)

*Primary Examiner* — Karen Masih
(74) *Attorney, Agent, or Firm* — McCoy Russell LLP (57) ABSTRACT

The present disclosure relates to the field of noise reduction technologies, and specifically a motor noise control method and apparatus, a computer device and a storage medium are provided. The method includes: determining a current driving mode of a vehicle and a total torque required by the vehicle in the current driving mode; acquiring an electric drive noise distribution matrix of the vehicle in the current driving mode, where the electric drive noise distribution matrix includes correspondences among target motor noises, (Continued)

```
┌─────────────────────────────────────────────────┐   S102
│ Determine a current driving mode of a vehicle    │
│ and a total torque required by the vehicle in    │
│ the current driving mode                         │
└─────────────────────────────────────────────────┘
                     ↓
┌─────────────────────────────────────────────────┐   S104
│ Acquire an electric drive noise distribution     │
│ matrix of the vehicle in the current driving     │
│ mode                                             │
└─────────────────────────────────────────────────┘
                     ↓
┌─────────────────────────────────────────────────┐   S106
│ Distribute a torque of each motor according to   │
│ the electric drive noise distribution matrix     │
└─────────────────────────────────────────────────┘
``` target motor speeds, and target motor torques of respective motors in the current driving mode; and distributing a torque of each motor according to the electric drive noise distribution matrix, where a sum of torques of respective motors is equal to the total torque required by the vehicle.

12 Claims, 4 Drawing Sheets

(56) References Cited

U.S. PATENT DOCUMENTS

| | | | |
|---|---|---|---|
| 9,475,404 | B2 | 10/2016 | Nakatsu |
| 2008/0122391 | A1 | 5/2008 | Iwase et al. |
| 2010/0002908 | A1 | 1/2010 | Miyamoto et al. |
| 2011/0251764 | A1 | 10/2011 | Iwase |
| 2014/0084829 | A1 | 3/2014 | Sung et al. |
| 2015/0057866 | A1 | 2/2015 | Tseng et al. |
| 2015/0298575 | A1 | 10/2015 | Nakatsu |
| 2020/0101975 | A1 | 4/2020 | Suzuki |
| 2020/0156621 | A1 | 5/2020 | Nakayama et al. |
| 2020/0171959 | A1 | 6/2020 | Kamino et al. |
| 2023/0344374 | A1* | 10/2023 | Chang .................. H02P 21/22 |

FOREIGN PATENT DOCUMENTS

| | | | |
|---|---|---|---|
| CN | 104661858 | A | 5/2015 |
| CN | 106515509 | A | 3/2017 |
| CN | 106515737 | A | 3/2017 |
| CN | 108389430 | A | 8/2018 |
| CN | 109635793 | A | 4/2019 |
| CN | 109969172 | A | 7/2019 |
| CN | 109995304 | A | 7/2019 |
| CN | 110210417 | A | 9/2019 |
| CN | 110233590 | A | 9/2019 |
| CN | 110414365 | A | 11/2019 |
| CN | 111204329 | A | 5/2020 |
| EP | 3932727 | A1 | 1/2022 |
| JP | 2010221896 | A | 10/2010 |
| JP | 2010284991 | A | 12/2010 |
| JP | 2013143861 | A * | 7/2013 |
| JP | 2014064448 | A | 4/2014 |
| JP | 2016112918 | A | 6/2016 |
| JP | 6007999 | B2 | 10/2016 |
| JP | 2020054132 | A | 4/2020 |
| JP | 2010114978 | A | 5/2020 |
| WO | 2011125222 | A1 | 10/2011 |

OTHER PUBLICATIONS

ISA State Intellectual Property Office of the People's Republic of China, Written Opinion of the International Searching Authority Issued in Application No. PCT/CN2020/115556, Jun. 7, 2021, WIPO, 5 pages. (Submitted with Machine/Partial Translation).

Japanese Patent Office, Office Action Issued in Application No. 2022-566125, Nov. 14, 2023, 8 pages. (Submitted with Machine Translation).

State Intellectual Property Office of the People's Republic of China, Office Action and Search Report Issued in Application No. 202010092933.3, Jun. 27, 2022, 15 pages. (Submitted with Machine Translation).

European Patent Office, Extended European Search Report Issued in Application No. 20953576.4, Jul. 3, 2023, Germany, 28 pages.

State Intellectual Property Office of the People's Republic of China, Office Action and Search Report Issued in Application No. 202080099539.0, Feb. 14, 2025, 17 pages. (Submitted with Machine Translation).

Korean Intellectual Property Office, Office Action Issued in Application No. 10-2023-7010092, Jun. 19, 2025, 11 pages. (Submitted with Abstract Translation).

* cited by examiner

METHOD AND APPARATUS FOR CONTROLLING ELECTRIC MOTOR NOISE, AND COMPUTER DEVICE AND STORAGE MEDIUM

CROSS REFERENCE TO RELATED APPLICATION

This application is a U.S. national phase application of PCT Application No. PCT/CN2020/115556, filed on Sep. 16, 2020, the entire contents of which are incorporated herein by reference for all purposes.

TECHNICAL FIELD

The present disclosure relates to the field of noise reduction technologies, and in particular, to a motor noise control method and apparatus, a computer device and a storage medium.

BACKGROUND

During driving of vehicles, especially during acceleration or energy recovery of the vehicles, both gear whine and motor whine are obvious. Generally, a conventional solution is to reduce noises through structure optimization, such as changes in electromagnetic forces of motors, gear modification, increases in sound packages, and increases in vehicle vibration insulation, to reduce the problem of whine in the vehicles.

However, according to the above method, a mechanical structure of drive mechanism is to be changed, which is costly and has little noise reduction effect.

SUMMARY

The technical problem to be solved by the present disclosure is to reduce noises of a vehicle without changing a physical structure of driving mechanism.

In order to solve the technical problem, a motor noise control method is provided. Specifically, the method includes:
  determining a current driving mode of a vehicle and a total torque required by the vehicle in the current driving mode;
  acquiring an electric drive noise distribution matrix of the vehicle in the current driving mode, where the electric drive noise distribution matrix includes correspondences among target motor noises, target motor speeds, and target motor torques of respective motors in the current driving mode; and
  distributing a torque of each motor according to the electric drive noise distribution matrix, where a sum of torques of respective motors is equal to the total torque required by the vehicle.

Further, before determining the current driving mode of the vehicle, the method further includes:
  establishing an electric drive noise distribution matrix of the vehicle in a preset driving mode, where a driving mode of the vehicle includes: a constant speed driving mode, an acceleration driving mode or a deceleration driving mode.

In some examples, establishing the electric drive noise distribution matrix of the vehicle in the preset driving mode includes:
  acquiring test noises corresponding to each motor in the preset driving mode;
  acquiring target motors of which test noises are greater than a preset noise;
  determining the test noises of the target motors as target motor noises of the target motors; and
  after acquiring target motor speeds and target motor torques corresponding to the target motor noises according to the target motor noises, establishing the electric drive noise distribution matrix.

Further, after determining the test noises of the target motors as the target motor noises of the target motors, the method further includes:
  sorting the target motor noises according to a preset sorting rule.

In some examples, sorting the target motor noises according to the preset sorting rule includes:
  sorting the target motor noises in an ascending order; or sorting the target motor noises in a descending order.

In some other examples, distributing the torque of each motor according to the electric drive noise distribution matrix includes:
  when a speed of one target motor reaches its corresponding target motor speed, distributing the torque of each motor according to a preset distribution rule; or
  when a torque of one target motor reaches its corresponding target motor torque, distributing the torque of each motor according to the preset distribution rule.

In some other examples, when the speed of one target motor reaches its corresponding target motor speed, distributing the torque of each motor according to the preset distribution rule includes:
  when the speed of one target motor reaches its corresponding target motor speed, distributing the torque of each motor according to a preset torque ratio, where the torque ratio is a ratio of the torque of each motor to the total torque required by the vehicle;
  when the torque of one target motor reaches its corresponding target motor torque, distributing the torque of each motor according to the preset distribution rule includes:
  when the torque of one target motor reaches its corresponding target motor torque, distributing the torque of each motor according to the preset torque ratio, where the torque ratio is the ratio of the torque of each motor to the total torque required by the vehicle.

Further, there is provided a motor noise control apparatus, including:
  a determination module, configured to determine a current driving mode of a vehicle and a total torque required by the vehicle in the current driving mode;
  an acquisition module, configured to acquire an electric drive noise distribution matrix of the vehicle in the current driving mode, where the electric drive noise distribution matrix includes correspondences among target motor noises, target motor speeds, and target motor torques of respective motors in the current driving mode; and
  a distribution module, configured to distribute a torque of each motor according to the electric drive noise distribution matrix, where a sum of torques of respective motors is equal to the total torque required by the vehicle.

Further, the apparatus further includes:
  an establishment module, configured to, before determining the current driving mode of the vehicle, establish an electric drive noise distribution matrix of the vehicle in a preset driving mode, where a driving mode of the vehicle includes: a constant speed driving mode, an acceleration driving mode or a deceleration driving mode.

Further, the establishment module is specifically configured to:
  acquire test noises corresponding to each motor in the preset driving mode;
  acquire target motors of which test noises are greater than a preset noise;
  determine the test noises of the target motors as target motor noises of the target motors;
  after acquiring target motor speeds and target motor torques corresponding to the target motor noises according to the target motor noises, establish the electric drive noise distribution matrix.

Further, the apparatus further includes: a sorting module, configured to, after determining the test noises of the target motors as the target motor noises of the target motors, sort the target motor noises according to a preset sorting rule.

Further, the sorting module is specifically configured to:
  sort the target motor noises in an ascending order; or
  sort the target motor noises in a descending order.

Further, the distribution module is specifically configured to:
  when a speed of one target motor reaches its corresponding target motor speed, distribute the torque of each motor according to a preset distribution rule; or
  when a torque of one target motor reaches its corresponding target motor torque, distribute the torque of each motor according to the preset distribution rule.

Further, the distribution module is further specifically configured to:
  when the speed of one target motor reaches its corresponding target motor speed, distribute the torque of each motor according to a preset torque ratio, where the torque ratio is a ratio of the torque of each motor to the total torque required by the vehicle; or
  when the torque of one target motor reaches its corresponding target motor torque, distribute the torque of each motor according to the preset torque ratio, where the torque ratio is the ratio of the torque of each motor to the total torque required by the vehicle.

Further, there is provided a computer device, including: a processor and a memory, where at least one instruction, at least one segment of program, a code set or an instruction set is stored in the memory, and the at least one instruction, the at least one segment of program, the code set or the instruction set is loaded and executed by the processor to implement the motor noise control method as described above.

Further, there is provided a computer storage medium, coupled to a processor and having at least one instruction, at least one segment of program, a code set or an instruction set stored thereon, and the at least one instruction, the at least one segment of program, the code set or the instruction set is loaded and executed by the processor to implement the motor noise control method as described above.

According to the above technical solutions, the motor noise control method and apparatus, the computer device and the storage medium described in the disclosure have the following beneficial effects:

According to the present disclosure, on the basis of not changing a physical structure of drive mechanism, by adjusting torques and avoiding motor speeds with severe noises, noises of motors are reduced, and thereby noises in a vehicle are reduced, which has obvious noise reduction effect, is easily and feasibly implemented, and has little impact on other performance of the vehicle.

BRIEF DESCRIPTION OF THE DRAWINGS

In order to illustrate the technical solutions in the embodiments of the disclosure more clearly, the accompanying drawings that need to be used in the description of the embodiments will be introduced briefly below. Obviously, the drawings described below are only some embodiments of the disclosure. For those of ordinary skill in the art, other drawings can be acquired from these drawings without creative work.

DETAILED DESCRIPTION OF THE EMBODIMENTS

In order to enable those skilled in the art to better understand the technical solutions of the disclosure, the technical solutions in the embodiments of the disclosure will be clearly and completely described below with reference to the accompanying drawings in the embodiments of the disclosure. Obviously, the described embodiments are only some but not all of embodiments of the disclosure. Based on the embodiments in the disclosure, all other embodiments acquired by those of ordinary skill in the art without creative work shall fall within the protection scope of the disclosure.

"One embodiment" or "embodiments" called herein refers to a particular feature, structure or characteristic that may be included in at least one implementation manner of the disclosure. In the description of the disclosure, it should be understood that terms "first", "second", "third", "fourth", etc. in the disclosure, claims and drawings are used for distinguishing different objects, not for describing a particular order. Furthermore, terms "comprising", "including" and "having", and any variations thereof are intended to cover non-exclusive inclusion. For example, processes, methods, systems, products or devices including a series of steps or units are not limited to the listed steps or units, but optionally further include unlisted steps or units, or other steps or units inherent to these processes, methods, systems, products or devices.

Figure 1:
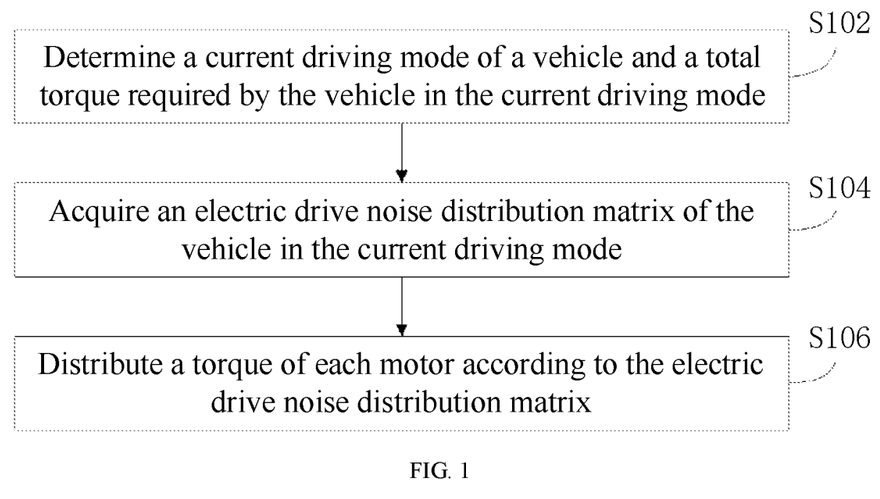
FIG. 1 is a flowchart illustrating a motor noise control method according to an embodiment of the disclosure.

In order to solve the above technical problems, a motor noise control method is provided. Specifically, FIG. 1 is a flowchart illustrating a motor noise control method according to an embodiment of the disclosure. As shown in FIG. 1, the method includes S102 to S106.

At S102, a current driving mode of a vehicle and a total torque required by the vehicle in the current driving mode are determined.

Specifically, driving modes of the vehicle may include a constant speed driving mode, an acceleration driving mode and a deceleration driving mode.

In an example, the current driving mode of the vehicle may be determined according to pedal depressing situations. Pedals include a brake pedal and an accelerator pedal. When stepping on the accelerator pedal is changed to stepping on the brake pedal, or when a force for stepping on the accelerator pedal is reduced, it can be determined that the vehicle is in the deceleration driving mode. When stepping on the brake pedal is changed to stepping on the accelerator pedal, or the force for stepping on the accelerator pedal is increased, it can be determined that the vehicle is in the acceleration driving mode. When the vehicle is driven to travel without changing the force for stepping on the accelerator pedal, it can be determined that the vehicle is in the constant speed driving mode.

It can be understood that the method for determining the current driving mode of the vehicle as introduced above is only illustrative, and in other examples, the current driving mode of the vehicle can be determined based on a rate of change in a vehicle speed within a preset time. It can be understood that the preset time can be set according to actual requirements, the rate of change in the vehicle speed may be a positive value or a negative value, and the rate of change can be compared with a preset rate of change. When the rate of change is the positive value and falls within a range of the preset rate of change, or when the rate of change is the negative value and falls within the range of the preset rate of change, it can be considered that the current driving mode of the vehicle is the constant speed driving mode. When the rate of change is the positive value and does not fall within the range of the preset rate of change, it can be considered that the vehicle is in the acceleration driving mode. When the rate of change is the negative value and does not fall within the range of the preset rate of change, it can be considered that the vehicle is in the deceleration driving mode. Further, the current driving mode of the vehicle may be determined based on other methods, which are not limited here.

Further, according to a current vehicle speed and an accelerator pedal opening degree, the total torque required by the vehicle in the current driving mode can be calculated through a look-up table. Calculating through the look-up table here is common knowledge in the art, and will not be repeated here. For example, as can be known from calculating through the look-up table, when the vehicle is in the deceleration driving mode, the total torque required by the vehicle is −500 Nm, where the negative sign "−" represents only an acceleration direction, that is, the vehicle is in the deceleration driving mode.

At S104, an electric drive noise distribution matrix of the vehicle in the current driving mode is acquired.

Specifically, the electric drive noise distribution matrix includes correspondences among target motor noises, target motor speeds, and target motor torques of respective motors in the current driving mode.

It can be understood that the vehicle may have two or more motors. In the electric drive noise distribution matrix, there is a one-to-one correspondence among a target motor noise, a target motor speed, and a target motor torque of each motor. A motor speed can be determined and changed according to an adjusted gear position of the vehicle.

At S106, a torque of each motor is distributed according to the electric drive noise distribution matrix.

Specifically, a sum of torques of respective motors is equal to the total torque required by the vehicle.

In an example, step S106 can be implemented based on the following step:
when a speed of one target motor reaches its corresponding target motor speed, distributing the torque of each motor according to a preset distribution rule.

In another example, step S106 can be implemented based on the following step:
when a torque of one target motor reaches its corresponding target motor torque, distributing the torque of each motor according to the preset distribution rule.

In some examples, when the speed of one target motor reaches its corresponding target motor speed, distributing the torque of each motor according to the preset distribution rule includes:
when the speed of one target motor reaches its corresponding target motor speed, distributing the torque of each motor according to a preset torque ratio, where the torque ratio is a ratio of the torque of each motor to the total torque required by the vehicle;
when the torque of one target motor reaches its corresponding target motor torque, distributing the torque of each motor according to the preset distribution rule includes:
when the torque of one target motor reaches its corresponding target motor torque, distributing the torque of each motor according to the preset torque ratio, where the torque ratio is a ratio of the torque of each motor to the total torque required by the vehicle.

It can be understood that a torque ratio of each motor can vary from 0 to 1.

A specific example will be given below for illustration:

In this example, a vehicle may include two motors, namely, a first motor and a second motor, where the first motor is configured to drive front wheels to rotate, and the second motor is configured to drive rear wheels to rotate. A total noise of the vehicle comes from a sum of a motor noise of the first motor and a motor noise of the second motor, and corresponds to different speeds and torques in different forms of working conditions.

In the present disclosure, a current driving mode of the vehicle being a deceleration driving mode will be taken as an example for description. In the deceleration driving mode, a total torque required by the vehicle is −500 Nm. It can be understood that the negative sign "−" represents only an acceleration direction, that is, the vehicle is in the deceleration driving mode, and the vehicle is in a $3^{rd}$ gear position.

Figure 2:
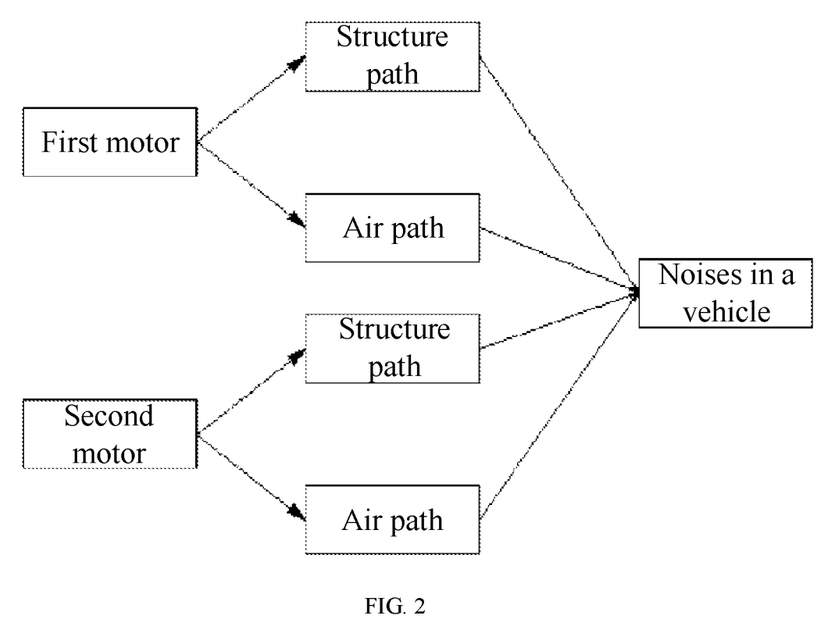
FIG. 2 is a schematic diagram illustrating a motor noise transfer path according to an embodiment of the disclosure.

At the $3^{rd}$ gear position, in the deceleration driving mode of the vehicle, noise transfer paths of the first motor and the second motor are shown in FIG. 2:

The motor noise of the first motor is transferred to an interior of the vehicle via a structure path and an air path. In the structure path, the motor noise of the first motor is transferred to the interior of the vehicle from a front suspension, a front sub-frame and/or a vehicle body. The front sub-frame is rigidly connected to the vehicle body, and sound insulation performance is poor. In the air path, the motor noise of the first motor is transferred to the interior of the vehicle via a front wall.

Further, the motor noise of the second motor is transferred to the interior of the vehicle via the structure path and the air path. In the structure path, the motor noise of the second motor is transferred to the interior of the vehicle from a rear suspension, a rear sub-frame and/or the vehicle body. The rear sub-frame is flexibly connected to the vehicle body, and vibration insulation performance is good. In the air path, the motor noise of the second motor is transferred to the interior of the vehicle via a rear vehicle body and an sound package (a general term for various sound-absorbing, sound-insulating, vibration-absorbing, and sealing components related to Noise, Vibration, Harshness (NVH) performance of the vehicle, such as a front wall panel (also referred to as dash panel/dash board) heat insulation pad, a carpet, a roof and hole plugs). Since the motor noise of the first motor and the motor noise of the second motor are transferred to the interior of the vehicle in different paths, sound insulation performance is different.

Figure 3:
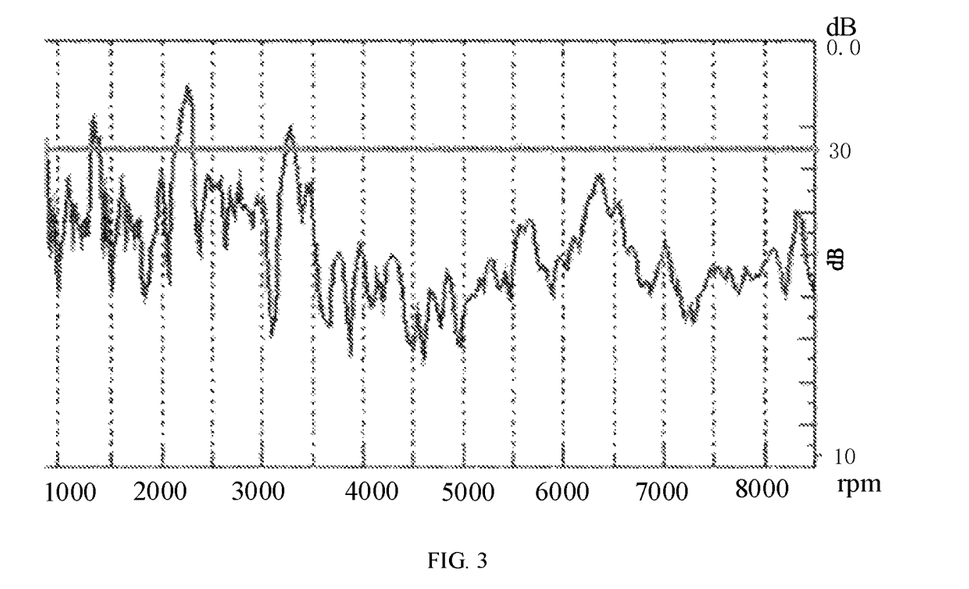
FIG. 3 is a schematic diagram illustrating motor noises of a first motor according to an embodiment of the disclosure.
Figure 4:
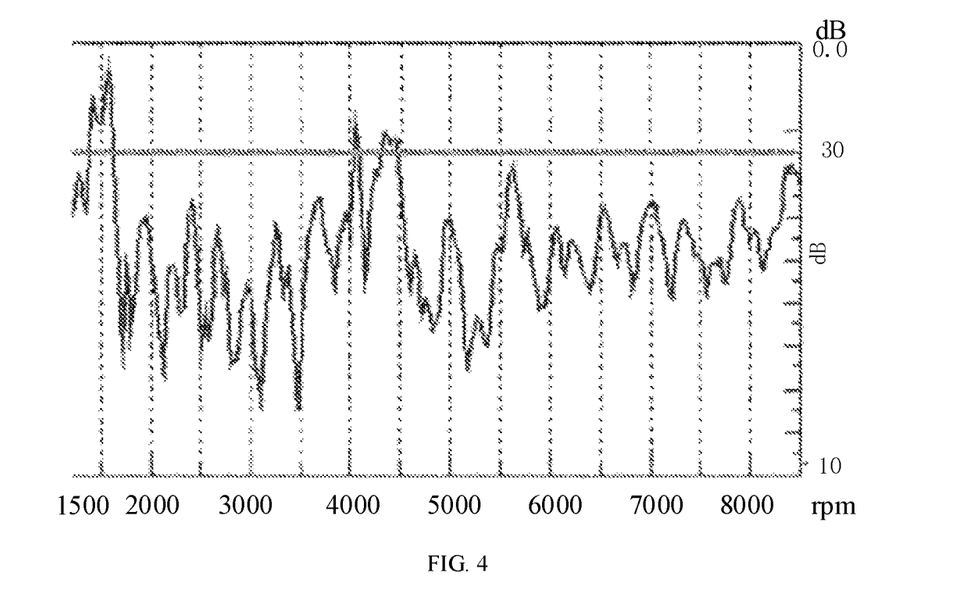
FIG. 4 is a schematic diagram illustrating motor noises of a second motor according to an embodiment of the disclosure.

Further, motor noises corresponding to different motor speeds can be acquired in a simulated deceleration driving mode. In some examples, the motor noises can be 24-order whine noises. Specifically, a diagram of motor noises of the first motor is shown in FIG. 3, and a diagram of motor noises of the second motor is shown in FIG. 4. Horizontal solid lines in FIG. 3 and FIG. 4 represent a standard motor noise. It can be considered that motor noises below the standard motor noise will not affect driving or riding experience of drivers or passengers, and can be ignored. It can be considered that motor noises above the standard motor noise will affect the driving or riding experience of drivers or passengers, and the motor noises are required to be reduced and recorded as target motor noises at target motor speeds.

After the motor noises at different motor speeds are acquired, an electric drive noise distribution matrix including target motor noises, target motor speeds, and target motor torques as shown in Table 1 is drawn, where there is a one-to-one correspondence among a target motor noise, a target motor speed, and a target motor torque of each motor, and the target motor speed and the target motor torque represent working condition points of the motor in a current form.

TABLE 1

|  | Target motor noises (dB) | Target motor speeds (rpm) | Target motor torques (Nm) |
| --- | --- | --- | --- |
| First motor | 32 | 1300 | 600 |
|  | 37 | 2300 | 1000 |
|  | 33 | 3200 | 1500 |
| Second motor | 39 | 1600 | 800 |
|  | 33 | 4000 | 2000 |
|  | 32 | 4300 | 2500 |

As can be seen from FIG. 3, FIG. 4 and Table 1, when the first motor is at speeds of 1300 rpm, 2300 rpm, and 3200 rpm, or the first motor is at torques of 600 Nm, 1000 Nm, and 1500 Nm, motor noises are more obvious; and when the second motor is at speeds of 1600 rpm, 4000 rpm, and 4300 rpm, or the second motor is at torques of 800 Nm, 2000 Nm, and 2500 Nm, motor noises are more obvious and required to be reduced. Therefore, based on the electric drive noise distribution matrix, when the vehicle is in the deceleration driving mode, and a speed of the first motor reaches 1300 rpm, 2300 rpm, or 3200 rpm, or a torque of the first motor reaches 600 Nm, 1000 Nm, or 1500 Nm, torques of the first motor and the second motor can be redistributed. In a case where the total torque required by the vehicle remains unchanged, a torque ratio of the first motor is reduced, and a torque ratio of the second motor is increased. For example, the torque ratio of the first motor is reduced from originally 7/10 to 3/10, and the torque ratio of the second motor is increased from originally 3/10 to 7/10. When a speed of the second motor reaches 1600 rpm, 4000 rpm, or 4300 rpm, or a torque of the second motor reaches 800 Nm, 2000 Nm, or 2500 Nm, the torques of the first motor and the second motor can be redistributed. In a case where the total torque required by the vehicle remains unchanged, the torque ratio of the first motor is increased, and the torque ratio of the second motor is reduced. For example, the torque ratio of the first motor is increased from originally 1/10 to 7/10, and the torque ratio of the second motor is reduced from originally 9/10 to 3/10.

It can be understood that both the torque ratio of the first motor and the torque ratio of the second motor can vary from 0 to 1, which is only an example and is not limited here.

It can be understood that, through torque distribution control strategies on the first motor and the second motor in the present disclosure, only ratios of torques of different motors are reduced without reducing the total torque required by the vehicle, and driving conditions do not change provision of the total torque required by the vehicle, do not affect dynamic performance of the vehicle, and has little impact on overall efficiency of motor drive.

It can be understood that the number of motors listed above being 2 is only exemplary illustration, and the motor noise control method in the present disclosure can be further applied to a vehicle having multiple motors, which has the same principle and will not be repeated here.

Figure 5:
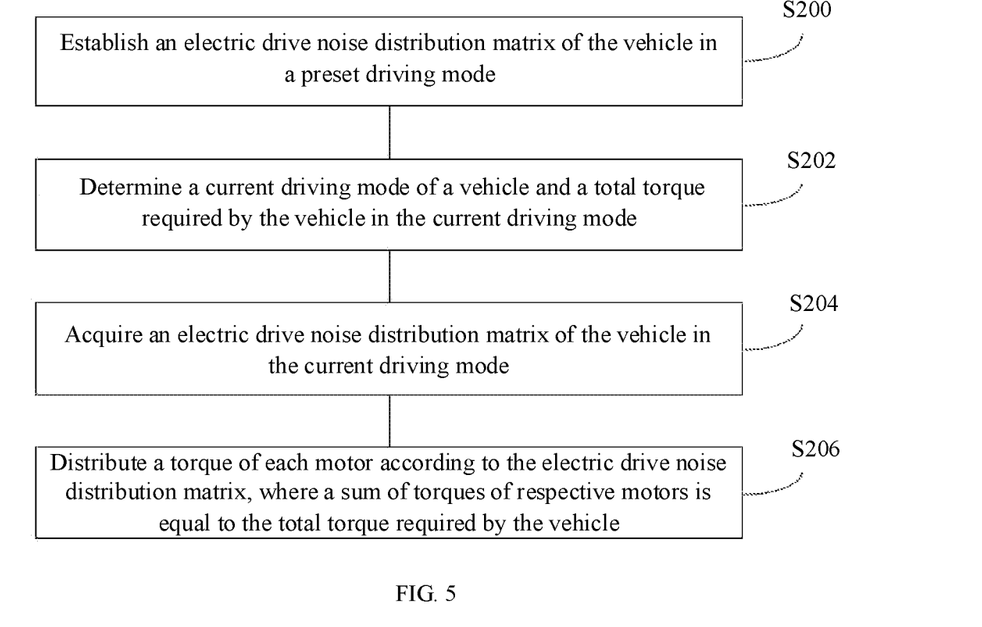
FIG. 5 is a flowchart illustrating a motor noise control method according to another embodiment of the disclosure.

In some other examples, there is provided another embodiment of the noise control method. As shown in FIG. 5, the method includes:

At S202, a current driving mode of a vehicle and a total torque required by the vehicle in the current driving mode are determined.

It can be understood that, before the current driving mode of the vehicle is determined, the method further includes:

At S200, an electric drive noise distribution matrix of the vehicle in a preset driving mode is established.

It can be understood that the preset driving mode is a driving mode of the vehicle simulated when speed simulation tests are performed on the vehicle and test noises of respective motors at different speeds are acquired, and the preset driving mode is used for acquiring the electric drive noise distribution matrix based on the test noises and simulated test speeds. That is, it can be understood that the preset driving mode mentioned here is a driving mode of the vehicle, including a constant speed driving mode, an acceleration driving mode and a deceleration driving mode.

Figure 6:
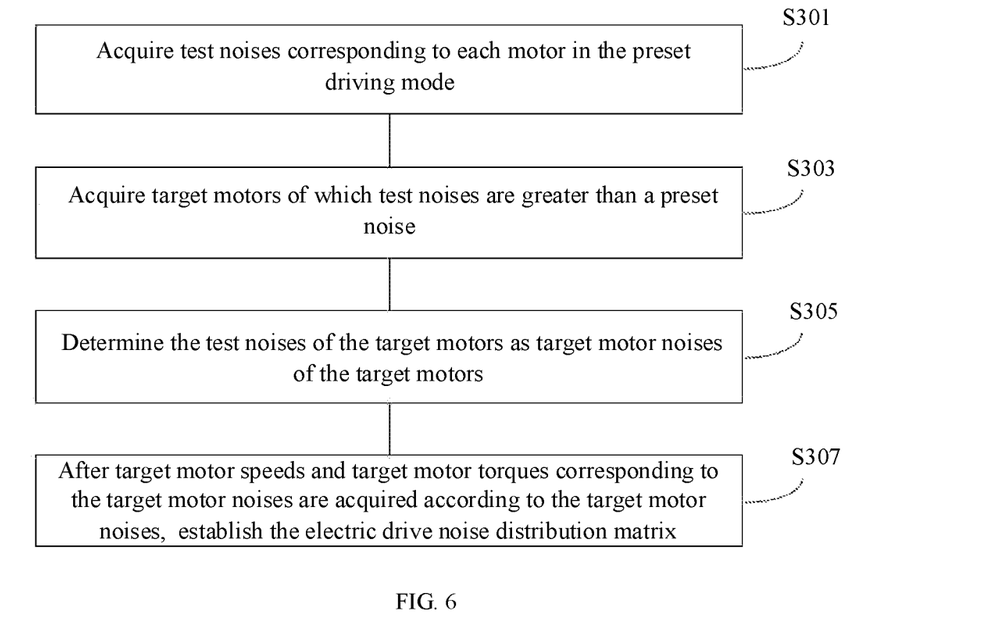
FIG. 6 is a flowchart illustrating a method for establishing an electric drive noise distribution matrix according to an embodiment of the disclosure.

Specifically, as shown in FIG. 6, in step S200, establishing the electric drive noise distribution matrix of the vehicle in the preset driving mode includes S301 to S307.

At S301, test noises corresponding to each motor in the preset driving mode are acquired;

At S303, target motors of which test noises are greater than a preset noise are acquired;

At S305, the test noises of the target motors are determined as target motor noises of the target motors;

At S307, after target motor speeds and target motor torques corresponding to the target motor noises are acquired according to the target motor noises, the electric drive noise distribution matrix is established.

Further, in other examples, after the test noises of the target motors are determined as the target motor noises of the target motors, the target motor noises can be sorted according to a preset sorting rule. For example, the target motor noises can be sorted in an ascending order.

In some examples, the target motor noises can be sorted in a descending order.

It can be understood that, by sorting motor noises, respective motors can be sorted clearly based on a motor noise order, so that a torque ratio occupied by each motor can be determined more quickly, and a torque adjustment rate can be improved.

At S204, an electric drive noise distribution matrix of the vehicle in the current driving mode is acquired, where the electric drive noise distribution matrix includes correspondences between target motor noises and target motor speeds of respective motors in the current driving mode.

At S206, a torque of each motor is distributed according to the electric drive noise distribution matrix, where a sum of torques of respective motors is equal to the total torque required by the vehicle.

It can be understood that, in this embodiment, for those not described, reference may be made to the description of the above embodiments.

Figure 7:
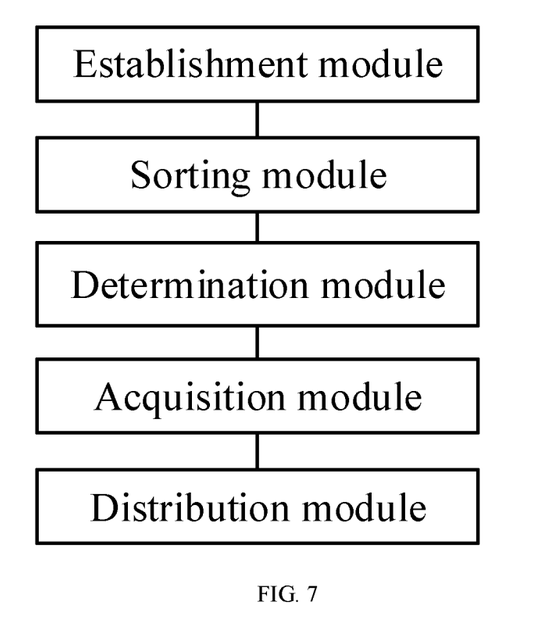
FIG. 7 is a block diagram illustrating a structure of a motor noise control apparatus according to the disclosure.

Further, there is provided a motor noise control apparatus. As shown in FIG. 7, the apparatus includes:

a determination module, configured to determine a current driving mode of a vehicle and a total torque required by the vehicle in the current driving mode;

an acquisition module, configured to acquire an electric drive noise distribution matrix of the vehicle in the current driving mode, where the electric drive noise distribution matrix includes correspondences among target motor noises, target motor speeds, and target motor torques of respective motors in the current driving mode; and a distribution module, configured to distribute a torque of each motor according to the electric drive noise distribution matrix, where a sum of torques of respective motors is equal to the total torque required by the vehicle.

Further, the apparatus further includes:

an establishment module, configured to, before determining the current driving mode of the vehicle, establish an electric drive noise distribution matrix of the vehicle in a preset driving mode, where a driving mode of the vehicle includes: a constant speed driving mode, an acceleration driving mode or a deceleration driving mode.

Further, the establishment module is specifically configured to:

acquire test noises corresponding to each motor in the preset driving mode;

acquire target motors of which test noises are greater than a preset noise;

determine the test noises of the target motors as target motor noises of the target motors; and after acquiring target motor speeds and target motor torques corresponding to the target motor noises according to the target motor noises, establish the electric drive noise distribution matrix.

Further, the apparatus further includes: a sorting module, configured to, after determining the test noises of the target motors as the target motor noises of the target motors, sort the target motor noises according to a preset sorting rule.

Further, the sorting module is specifically configured to:

sort the target motor noises in an ascending order; or sort the target motor noises in a descending order.

Further, the distribution module is specifically configured to:

when a speed of one target motor reaches its corresponding target motor speed, distribute the torque of each motor according to a preset distribution rule; or when a torque of one target motor reaches its corresponding target motor torque, distribute the torque of each motor according to the preset distribution rule.

Further, the distribution module is further specifically configured to:

when the speed of one target motor reaches its corresponding target motor speed, distribute the torque of each motor according to a preset torque ratio, where the torque ratio is a ratio of the torque of each motor to the total torque required by the vehicle; or when the torque of one target motor reaches its corresponding target motor torque, distribute the torque of each motor according to the preset torque ratio, where the torque ratio is the ratio of the torque of each motor to the total torque required by the vehicle.

Further, there is provided a computer device, including: a processor and a memory, where at least one instruction, at least one segment of program, a code set or an instruction set is stored in the memory, and the at least one instruction, the at least one segment of program, the code set or the instruction set is loaded and executed by the processor to implement the motor noise control method as described above.

Further, there is provided a computer storage medium, coupled to a processor and having at least one instruction, at least one segment of program, a code set or an instruction set stored thereon, and the at least one instruction, the at least one segment of program, the code set or the instruction set is loaded and executed by the processor to implement the motor noise control method as described above.

According to the disclosure, on the basis of not changing a mechanical structure of drive mechanism, by adjusting torques and avoiding motor speeds with severe noises, noises of motors are reduced, and thereby noises in a vehicle are reduced, which has obvious noise reduction effect, easily and feasibly implemented, and has little impact on other performance of the vehicle.

It is worth noting that, in apparatus and terminal embodiments, modules and units included are divided only according to functional logic, but are not limited to the above division, as long as corresponding functions can be realized; in addition, specific names of the modules and units are only for convenience of being distinguished from each other, and are not used to limit the protection scope of the disclosure.

In several embodiments provided in the present disclosure, it should be understood that the disclosed apparatus and method may be implemented in other ways. The terminal examples described above are only schematic. For example, the division of modules or units is only division of logical functions, and in actual implementation, there may be other division manners, for example, multiple units or components may be combined, or integrated into another system, or some features may be ignored, or not be implemented. In addition, the coupling or direct coupling or communication connection between displayed or discussed components may be through some interfaces, and indirect coupling or communication connection between modules or units may be electrical, mechanical or in other forms.

The above are only embodiments of the disclosure, which are not intended to limit the disclosure. Any modification, equivalent replacement, improvement, etc. made within the spirit and principle of the disclosure shall be included in the protection scope of the disclosure.

The invention claimed is:

1. A motor noise control method, comprising:
   determining a current driving mode of a vehicle and a total torque required by the vehicle in the current driving mode;
   acquiring an electric drive noise distribution matrix of the vehicle in the current driving mode, wherein the electric drive noise distribution matrix comprises correspondences among target motor noises, target motor speeds, and target motor torques of respective motors in the current driving mode; and distributing a torque of each motor according to the electric drive noise distribution matrix, wherein a sum of torques of respective motors is equal to the total torque required by the vehicle, wherein an electric drive noise distribution matrix of the vehicle in a preset driving mode is established by:

acquiring test noises corresponding to each motor in the preset driving mode;

acquiring target motors of which test noises are greater than a preset noise;

determining the test noises of the target motors as target motor noises of the target motors; and after acquiring target motor speeds and target motor torques corresponding to the target motor noises according to the target motor noises, establishing the electric drive noise distribution matrix, wherein the preset driving mode comprises: a constant speed driving mode, an acceleration driving mode or a deceleration driving mode.

2. The motor noise control method according to claim 1, wherein after determining the test noises of the target motors as the target motor noises of the target motors, the method further comprises:

sorting the target motor noises in an ascending order; or
sorting the target motor noises in a descending order.

3. The motor noise control method according to claim 1, wherein distributing the torque of each motor according to the electric drive noise distribution matrix comprises:

when a speed of one target motor reaches its corresponding target motor speed, distributing the torque of each motor according to a preset distribution rule; or when a torque of one target motor reaches its corresponding target motor torque, distributing the torque of each motor according to the preset distribution rule.

4. The motor noise control method according to claim 3, wherein the preset distribution rule comprises a preset torque ratio, wherein the torque ratio is a ratio of the torque of each motor to the total torque required by the vehicle.

5. A non-transitory computer device, comprising: a processor and a memory, wherein at least one instruction, at least one segment of program, a code set or an instruction set is stored in the memory, and the at least one instruction, the at least one segment of program, the code set or the instruction set is loaded and executed by the processor to:

determine a current driving mode of a vehicle and a total torque required by the vehicle in the current driving mode;

acquire an electric drive noise distribution matrix of the vehicle in the current driving mode, wherein the electric drive noise distribution matrix comprises correspondences among target motor noises, target motor speeds, and target motor torques of respective motors in the current driving mode; and distribute a torque of each motor according to the electric drive noise distribution matrix, wherein a sum of torques of respective motors is equal to the total torque required by the vehicle, wherein an electric drive noise distribution matrix of the vehicle in a preset driving mode is established by:

acquiring test noises corresponding to each motor in the preset driving mode;

acquiring target motors of which test noises are greater than a preset noise;

determining the test noises of the target motors as target motor noises of the target motors; and after acquiring target motor speeds and target motor torques corresponding to the target motor noises according to the target motor noises, establishing the electric drive noise distribution matrix, wherein the preset driving mode comprises: a constant speed driving mode, an acceleration driving mode or a deceleration driving mode.

6. The non-transitory computer device according to claim 5, wherein after determining the test noises of the target motors as the target motor noises of the target motors, the at least one instruction, the at least one segment of program, the code set or the instruction set is executed by the processor to:

sort the target motor noises in an ascending order; or
sort the target motor noises in a descending order.

7. The non-transitory computer device according to claim 5, wherein when distributing the torque of each motor according to the electric drive noise distribution matrix, the at least one instruction, the at least one segment of program, the code set or the instruction set is executed by the processor to:

when a speed of one target motor reaches its corresponding target motor speed, distribute the torque of each motor according to a preset distribution rule; or when a torque of one target motor reaches its corresponding target motor torque, distribute the torque of each motor according to the preset distribution rule.

8. The non-transitory computer device according to claim 7, wherein the preset distribution rule comprises a preset torque ratio, wherein the torque ratio is a ratio of the torque of each motor to the total torque required by the vehicle.

9. A non-transitory computer storage medium, coupled to a processor and having at least one instruction, at least one segment of program, a code set or an instruction set stored thereon, wherein the at least one instruction, the at least one segment of program, the code set or the instruction set is loaded and executed by the processor to:

determine a current driving mode of a vehicle and a total torque required by the vehicle in the current driving mode;

acquire an electric drive noise distribution matrix of the vehicle in the current driving mode, wherein the electric drive noise distribution matrix comprises correspondences among target motor noises, target motor speeds, and target motor torques of respective motors in the current driving mode; and distribute a torque of each motor according to the electric drive noise distribution matrix, wherein a sum of torques of respective motors is equal to the total torque required by the vehicle, wherein an electric drive noise distribution matrix of the vehicle in a preset driving mode is established by:

acquiring test noises corresponding to each motor in the preset driving mode;

acquiring target motors of which test noises are greater than a preset noise;

determining the test noises of the target motors as target motor noises of the target motors; and after acquiring target motor speeds and target motor torques corresponding to the target motor noises according to the target motor noises, establishing the electric drive noise distribution matrix, wherein the preset driving mode comprises: a constant speed driving mode, an acceleration driving mode or a deceleration driving mode.

10. The storage medium according to claim 9, wherein after determining the test noises of the target motors as the target motor noises of the target motors, the at least one instruction, the at least one segment of program, the code set or the instruction set is executed by the processor to:
sort the target motor noises in an ascending order; or
sort the target motor noises in a descending order.

11. The storage medium according to claim 9, wherein when distributing the torque of each motor according to the electric drive noise distribution matrix, the at least one instruction, the at least one segment of program, the code set or the instruction set is executed by the processor to:
when a speed of one target motor reaches its corresponding target motor speed, distribute the torque of each motor according to a preset distribution rule; or
when a torque of one target motor reaches its corresponding target motor torque, distribute the torque of each motor according to the preset distribution rule.

12. The storage medium according to claim 11, wherein the preset distribution rule comprises a preset torque ratio, wherein the torque ratio is a ratio of the torque of each motor to the total torque required by the vehicle.

* * * * *